(12) United States Patent
Jager

(10) Patent No.: US 7,484,783 B2
(45) Date of Patent: Feb. 3, 2009

(54) TRAILER WITH DUAL POSITION FRONT GATE

(75) Inventor: Willem Jager, Breslaw (CA)

(73) Assignee: Linamar Corporation, Guelph, Ontario (CA)

( * ) Notice: Subject to any disclaimer, the term of this patent is extended or adjusted under 35 U.S.C. 154(b) by 442 days.

(21) Appl. No.: 11/442,731

(22) Filed: May 30, 2006

(65) Prior Publication Data
US 2007/0138784 A1    Jun. 21, 2007

(30) Foreign Application Priority Data
Dec. 16, 2005 (CA) .................... 2530671

(51) Int. Cl.
B60P 3/34 (2006.01)
(52) U.S. Cl. .................. 296/26.11; 296/26.08
(58) Field of Classification Search .............. 296/26.11, 296/26.15, 26.08
See application file for complete search history.

(56) References Cited
U.S. PATENT DOCUMENTS

| 418,451 A | 1/1889 | Konecheck |
| 2,569,965 A | 10/1951 | Wiedman |
| 3,612,600 A | 10/1971 | Salichs |
| 4,126,324 A | 11/1978 | Browning |
| 4,362,316 A | 12/1982 | Wright |
| 4,767,150 A | 8/1988 | Hall |
| 4,772,038 A | 9/1988 | MacDonald |
| 5,340,134 A | 8/1994 | Dodson |
| 5,480,180 A | 1/1996 | Fuller et al. |
| 5,544,944 A | 8/1996 | Keech |
| 5,711,569 A | 1/1998 | Sovoda |
| 5,857,825 A | 1/1999 | Rice |
| 6,378,893 B1 | 4/2002 | Jager |

FOREIGN PATENT DOCUMENTS

CA    2466619    11/2005

*Primary Examiner*—Joseph D Pape
(74) *Attorney, Agent, or Firm*—Riches, McKenzie & Herbert LLP

(57) ABSTRACT

A gate assembly for a trailer which provides for the gate assembly to be moved between a closed position in which both a lower gate member and an upper gate member are stacked and extend upwardly one upon the other and an extension position in which the lower gate member extends forwardly from an end of the deck as an extension of the deck and the upper gate member extends upwardly from the end of the lower gate member.

16 Claims, 10 Drawing Sheets

TRAILER WITH DUAL POSITION FRONT GATE

SCOPE OF THE INVENTION

This invention relates to a trailer and, more particularly, to a novel trailer gate providing gating in both an upright and trailer deck extending configurations.

BACKGROUND OF THE INVENTION

Known front gate assemblies for trailers suffer the disadvantage that they do not provide for extension of the deck of the trailer forwardly or, if they do provide for extension of the deck forwardly, do not provide in an extended position a forward fence to prevent movement of loads forwardly of the deck in the extended position.

Known tail gate assemblies suffer one or more of the disadvantages that they do not provide a ramp for on and off loading, or if they provide a ramp for on and off loading, they do not provide ramps adjustable for different usages such as for four-wheel vehicles having different widths of tire spacings and for persons walking up or down the ramps. As well, many tail gate assemblies including ramps block the rearward vision through the tail gate assemblies which can be disadvantageous to persons driving vehicles.

SUMMARY OF THE INVENTION

To at least partially overcome these disadvantages of previously known devices, the present invention provides a gate assembly for a trailer which provides for the gate assembly to be moved between a closed position in which both a lower gate member and an upper gate member are stacked and extend upwardly one upon the other and an extension position in which the lower gate member extends forwardly from an end of the deck as an extension of the deck and the upper gate member extends upwardly from the end of the lower gate member.

An object of the present invention is to provide a gate for a trailer which closes an end or side of the trailer by extending upwardly in one condition and which is movable to a second condition in which a lower gate member extends outwardly from the deck to extend the area of the deck and an upper gate member extends upwardly.

In one aspect, the present invention provides a trailer having a support deck having two side ends, a front end and a rear end, a pair of spaced post members each fixedly coupled to the deck to be upstanding from the deck adjacent the same one end of the deck selected from the two side ends, the front end and the rear end, a gate assembly comprising a lower gate member, an upper gate member and a pair of elongate link members, the lower gate member having a lower end, an upper end parallel the lower end, and two side ends, the lower end of the lower gate member connected to the trailer between the post members for pivoting about a first axis between a closed position in which the lower gate member extends upwardly from the one end of the deck to close the trailer between the post members and an extended position in which the lower gate member extends from the one end of the deck as an extension of the deck substantially in the same plane as the deck, the upper gate member having a lower end, an upper end parallel the lower end, and two side ends, the lower end of the upper gate member pivotably connected to the upper end of the lower gate member for pivoting about a second axis parallel to the first axis between a stacked position in which the upper gate member extends upwardly from the upper end of the lower gate member when the lower gate member is in the closed position to close the trailer between the post members above the lower gate member and a fence position in which the upper gate member extends upwardly from the upper end of the lower gate member when the lower gate member is in the extended position, the link members each having a first end and a second end, each first end of each link member pivotably coupled to a respective one of the two side ends of the upper gate member spaced from the second axis towards the upper end of the upper gate member for pivoting about a third axis parallel to the first axis, each second end of each link member pivotably coupled to a respective one of the post members spaced upwardly from the first axis for pivoting about a fourth axis parallel to the first axis, wherein the link members, the post members, the lower gate member and the upper gate member are pivotably coupled together for pivoting about the first axis, second axis, third axis and fourth axis such that when the lower gate member moves to its extended position, the upper gate member moves to its fence position and when the lower gate member moves to its closed position the upper gate member moves to its stacked position.

To at least partially overcome disadvantages of previously known devices, the present invention provides a gate assembly for a vehicle, preferably a trailer, which provides for the gate assembly to be moved between an open and a closed position and to serve as a ramp in a closed position and in which a pair of ramp members are slidably disposed for location in different positions laterally relative to the gate assembly.

An object of the present invention is to provide a gate assembly which provides advantageously laterally slidable ramps.

In one aspect, the present invention provides a trailer having a support deck, a gate assembly comprising a lower gate member, a pair of side extension members, an upper end member, and a pair of elongate ramp members, the lower gate member having an inner end, an outer end parallel the inner end, and two side ends, each side extension member having an outer end and a distal inner end, each side extension member fixedly connected at its inner end to the lower gate member to extend in a plane of the lower gate member from the outer end of the lower gate member away from the lower gate member adjacent each side end of the lower gate member to their respective, outer end with each side extension member parallel to each other laterally spaced from each other, the upper end member secured to the distal ends of the side extension member to bridge between the side extension members spaced outwardly from the outer end of the lower gate member, each ramp member having an inner end and an outer end, each ramp member bridging between the outer end of the lower gate member and the upper end member disposed parallel to each other, the inner end of each ramp member coupled to the outer end of the lower gate member in a manner which permits for sliding side-to-side of each ramp member relative to the lower gate member, the outer end of each ramp member coupled to the upper end member in a manner which permits for sliding side-to-side of each ramp member relative to the upper end member, the inner end of the lower gate member pivotably connected to the trailer at an end of the deck for pivoting about an axis between a closed, storage position in which the gate assembly extends upwardly from the end of the deck and an open, ramp position in which outermost portions of the gate assembly engages the ground about the trailer and the gate assembly bridges the end of the deck and the ground, each ramp member adapted to receive and support loads to be moved across the gate assembly between the lower gate member and the upper end member.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
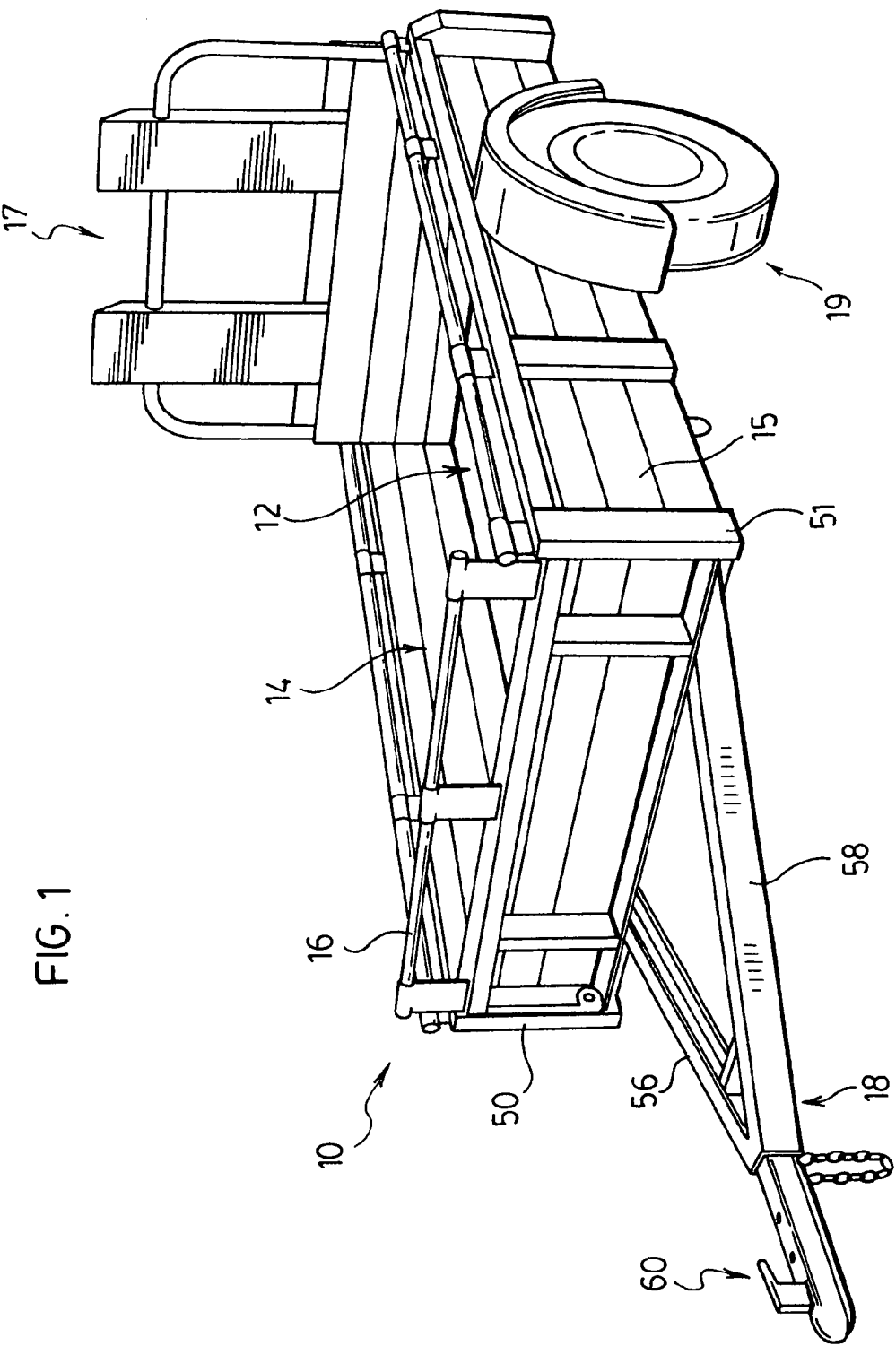
FIG. 1 is a perspective view of a trailer in accordance with a first embodiment of the present invention and showing each of a front gate assembly and a rear gate assembly in a closed, upright position.

Reference is made first to FIG. 1 which illustrates a utility trailer 10 adapted to be towed behind a vehicle, preferably, a motorized vehicle, not shown.

The trailer 10 has a bed 12, side walls 14 and 15, a front gate assembly 16, a rear gate assembly 17, a tongue 18 and a pair of wheel assemblies 19. The side wall 14 carries a front corner post 50 which extends upwardly from the bed 12 at the front end of the trailer. Similarly, the side wall 15 carries a front corner post 51 extending upwardly from the bed 12 at the front of the trailer. The tongue 18 extends forwardly from the trailer as for coupling to a vehicle to tow the trailer.

The bed 12 has an upper deck surface 20 with a rear deck end 22, a front deck end 24 and two side deck ends 26 and 27. The front gate assembly 16 includes four main elements. As best seen in the extended position in FIGS. 2, 3 and 5, the front gate assembly 16 has a lower gate member 30, an upper gate member 32 and a pair of link members 34 and 35. The lower gate member 30 has a lower end 38, an upper end 40 parallel to the lower end 38 and two side ends 42 and 43. The lower end 38 of the lower gate member 30 is pivotally connected, at each of its side ends to the posts 50 and 51, to be pivotable relative to the front end 24 of the bed 12, for pivoting about a first axis 61.

The upper gate member 32 has a lower end 44 and an upper end 46 parallel the lower end 44 and two side ends 48 and 49. The upper end 40 of the lower gate member 30 is pivotally connected to the lower end 44 of the upper gate member 32 for pivoting about a second axis 62 parallel to the first axis 61. Each of the upper gate member 32 and lower gate member 30 are seen to extend laterally across the width of the bed 12 effectively from one side wall 14 to the other side wall 15.

Figure 4:
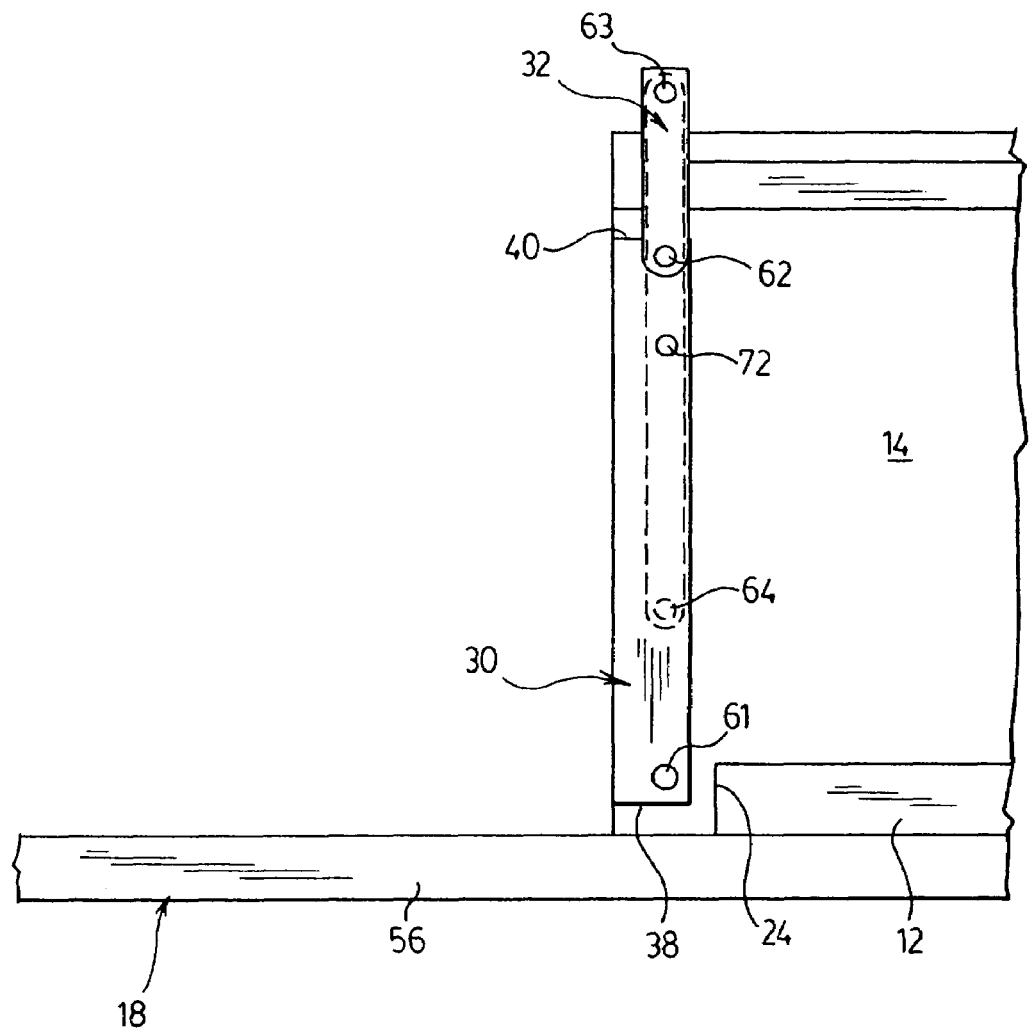
FIG. 4 is a schematic cross-sectional side view of the front portion of the trailer in FIG. 1 along section line 4-4' showing the front gate assembly in a closed position.

The link member 34 is pivotally connected at a first end 52 to the side post 50 for pivoting about a fourth axis 64 parallel to the first axis 61. The second end 54 of the link member 34 is pivotally connected to the upper end 46 of the upper gate member 32 for pivoting about a third axis 63 parallel to the first axis 61. In the preferred embodiment, the distance between the first axis 61 and the second axis 62 is equal to the distance between the third axis 63 and the fourth axis 64. As well, the distance between the first axis 61 and the fourth axis 64 is the same as the distance between the second axis 62 and the third axis 63. With the lower end 38 of the lower gate member 30 to be pivotally connected to the posts 50 and 51, four elements on each side comprising the post 50 (or 51) on each side, the link member 34 (or 35) on each side and the lower gate member 30 and the upper gate member 32 provide a pantograph type relation in which the front gate assembly 16 may be pivoted between an extended position shown in FIG. 5 to the closed, stacked position shown in FIG. 4. In the closed, stacked position of the gate assembly 16 shown in FIG. 4, the lower gate member 30 extends upwardly from the front deck end 24 of the bed 12 to close the trailer between the sides 14 and 15 and the upper gate member 32 extends upwardly from the upper end 40 of the lower gate member 30. In the closed, stacked position in FIG. 4, each of the link members 34 and 35 also extend upwardly. As seen in FIG. 4, the first axis 61, second axis 62, third axis 63 and fourth axis 64 each lie in the same vertical plane.

The tongue 18 is shown in FIG. 1 as having two side arms 56 and 58 which are coupled to the underside of the bed 12 and extend forwardly from front end 24 of the bed 12 to where they are joined at their front end with a hitch mechanism 60 for coupling the trailer as to a vehicle. The side arms 56 and 58 of the tongue 18 closely underlie an under surface of the bed 12 and provide support surfaces for engagement of an underside 59 of the lower gate member 30 to prevent the lower gate member 30 from pivoting about the first axis 61 downwardly beyond the extended position illustrated in FIG. 5.

Figure 2:
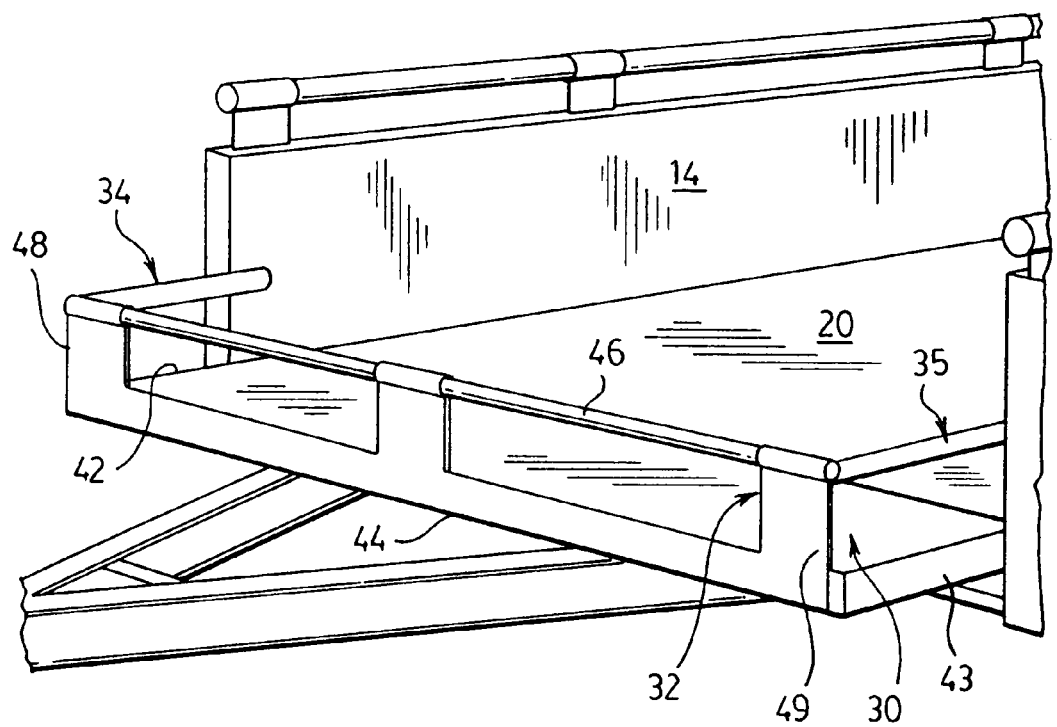
FIG. 2 is an enlarged perspective view of a portion of the front end of the trailer of FIG. 1, however, showing the front gate assembly in an extended position.
Figure 3:
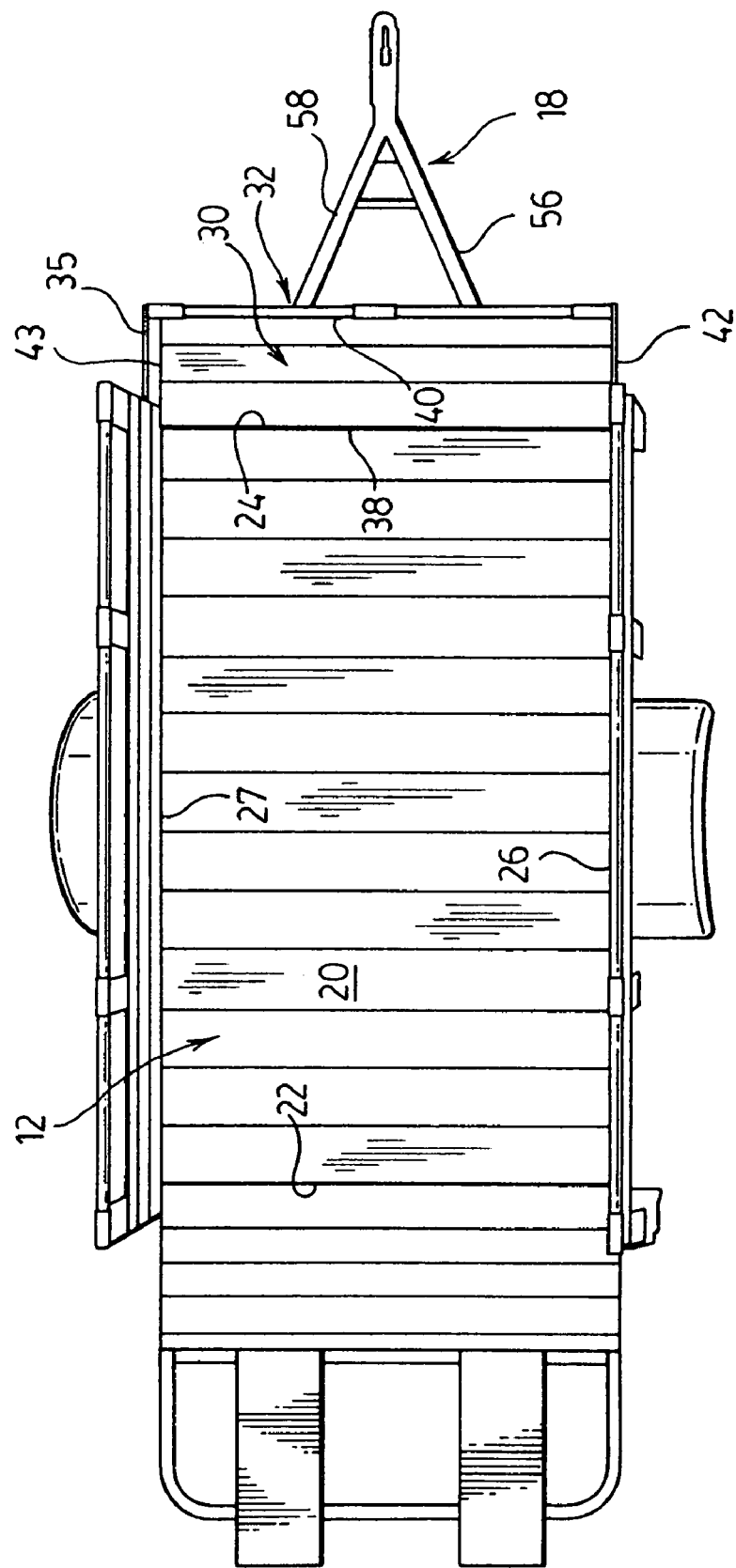
FIG. 3 is a perspective top view of the trailer of FIG. 1 showing both the front gate assembly in an extended position and the rear gate assembly in an extended position.
Figure 5:
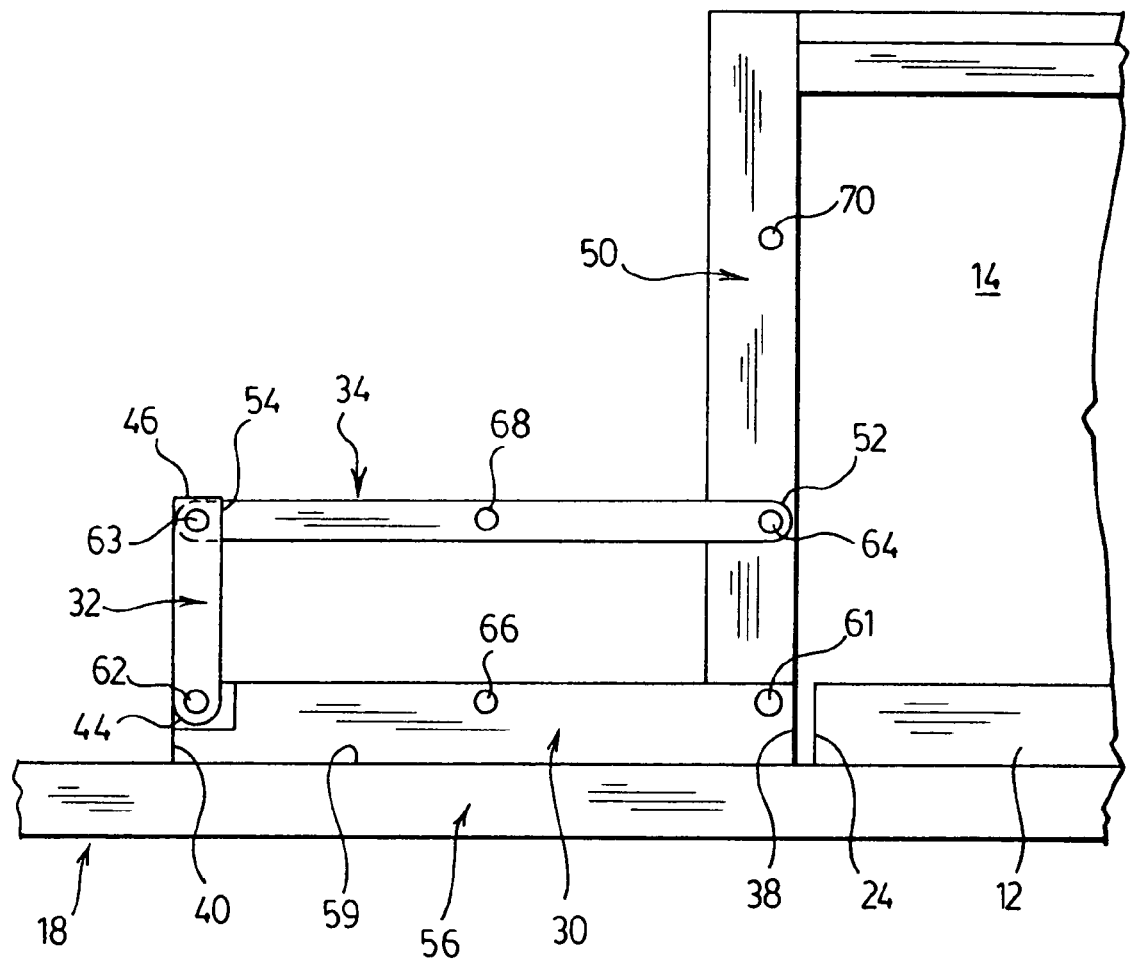
FIG. 5 is a cross-sectional side view of the same as FIG. 4, however, showing the front gate assembly in an extended position.

In the extended position of the gate assembly 16, as seen in FIGS. 2, 3 and 5, the lower gate member 30 extends forwardly from the front end 24 of the bed 12, supported by the tongue 18 and increases the load carrying area of the bed 12 by an amount approximately equal to the area of the lower gate member 30. In the extended position, as seen in FIG. 1, the upper gate member 32 provides a vertical gate or barrier towards assisting in preventing a load on the bed from sliding forwardly off the front end of the extended bed.

FIG. 5 best shows three openings used to lock the gate assembly 16 in the closed, stacked position. In this regard, the lower gate member 30 has a centrally located opening 66 extending into each of its ends. Each of the link members 34 and 35 has a central opening 68 between its ends. Further, each post 50 and 51 has a corresponding opening 70. In the closed, stacked position of the gate assembly 16 in FIG. 4, these three openings are in alignment. A pin member 72 shown in FIG. 4 extends through the aligned openings 66, 68 and 70 parallel the first axis 61 to lock the lower gate member 30, link member 34 and side post 50 against relative movement. The pin 72 is removably received within these openings for manual insertion and removal to lock and unlock the gate assembly 16 in the upright stacked position.

One mechanism for locking the front gate assembly 16 in the upright position has been disclosed using pins 72 to couple against relative movement, three elements, namely the post 50, a link member 34 and the lower gate member 30. It is to be appreciated that similar pins which engage any two of the four members on each side comprising one side post 50 (or 51), one link member 34 (or 35), the lower gate member 30 and the upper gate member 32 will lock all four members against movement. Rather than have the lock pin 72 pass through the lower gate member 30 as shown in the preferred embodiment, similar apertures could be provided through the upper gate member 32 intermediate the second axis 62 and third axis 63 with correspondingly located apertures through the link member 34 and post 50.

In the preferred embodiment, the tongue member 18 preferably supports the lower gate member 30 in the extended position of the gate assembly 16 to permit the lower gate member 30 to support loads. Various other arrangements can be provided to support the lower gate member 30 in the extended position as, for example, including support chains (not shown) to extend in the extended position diagonally from an upper end of the posts 50 and 51 to the upper ends 40 of the lower gate member 30. Alternatively, the lower end 38 of the lower gate member 30 may couple to the front end 24 of the bed 12 in a manner which their interaction supports the lower gate member 30 in a cantilever manner in the extended position. Alternatively, elongate beams could be slidably supported underneath the bed 12 adapted to be slid forwardly longitudinally outwardly towards the front to extend forwardly in a cantilevered manner and provide a support surface for the lower gate member 30.

Each of the link members 34 and 35 preferably is outside of each outer side end 42 or 43 of the lower gate member 30 and inside of the posts 50 and 51 of the trailer sides 14 and 15, although this is not necessary.

The preferred first embodiment illustrates the gate assembly 16 as being provided at the front end of a trailer. It is to be appreciated that a similar extendable gate member could be provided at the rear end of a trailer in which case some other mechanism than the tongue would be needed to support the lower gate member 30 in the extended position.

In the context of a trailer in which the ground engaging wheels may be disposed at a height below the bed, a similar gate assembly could be provided, on the side ends 26 and 27 of the bed 12 to extend the lower carrying surface of the bed 12 laterally. In a trailer having wheel assemblies 19 of the general configuration indicated in the trailer in FIG. 1, providing the wheel assemblies 19 to be capable of being shifted laterally to the side could be a manner in which two gate assemblies could be provided one on each side of the trailer and adapted for use in expanding the width of the trailer once the wheel assemblies 19 may been moved laterally a desired amount as, for example, by the provision of an extendable length wheel axle.

Figure 6:
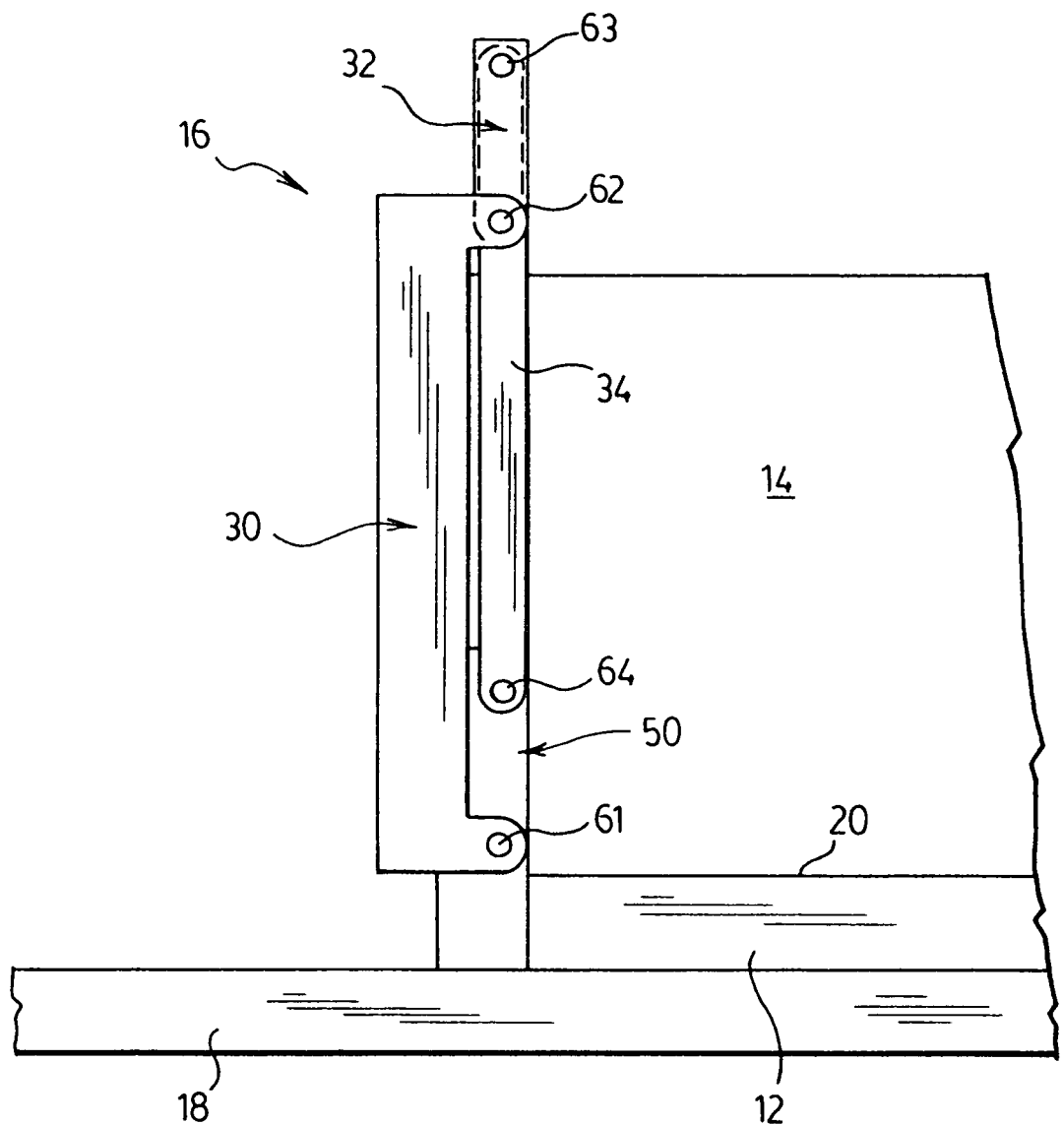
FIG. 6 is a schematic cross-section similar to that in FIG. 4 but showing a front gate assembly in accordance with a second embodiment.
Figure 7:
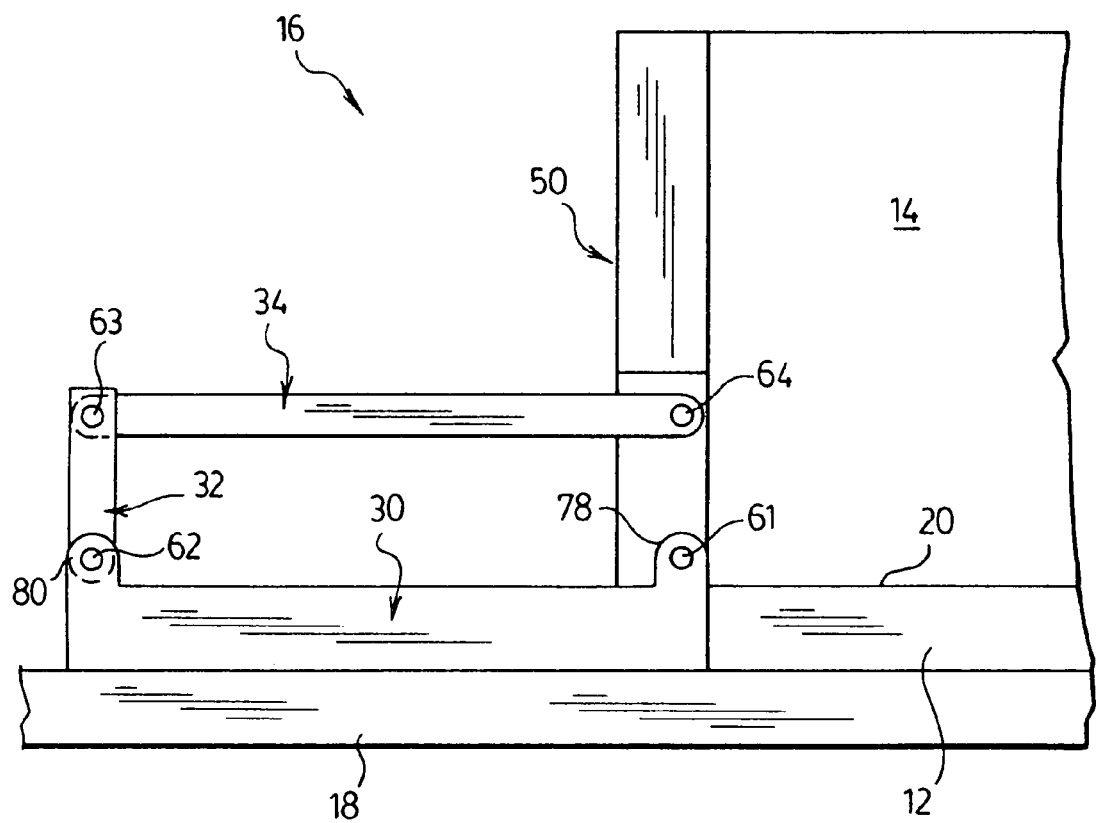
FIG. 7 is a side view of the second embodiment of FIG. 6 but with the front gate assembly in an open position.
Figure 8:
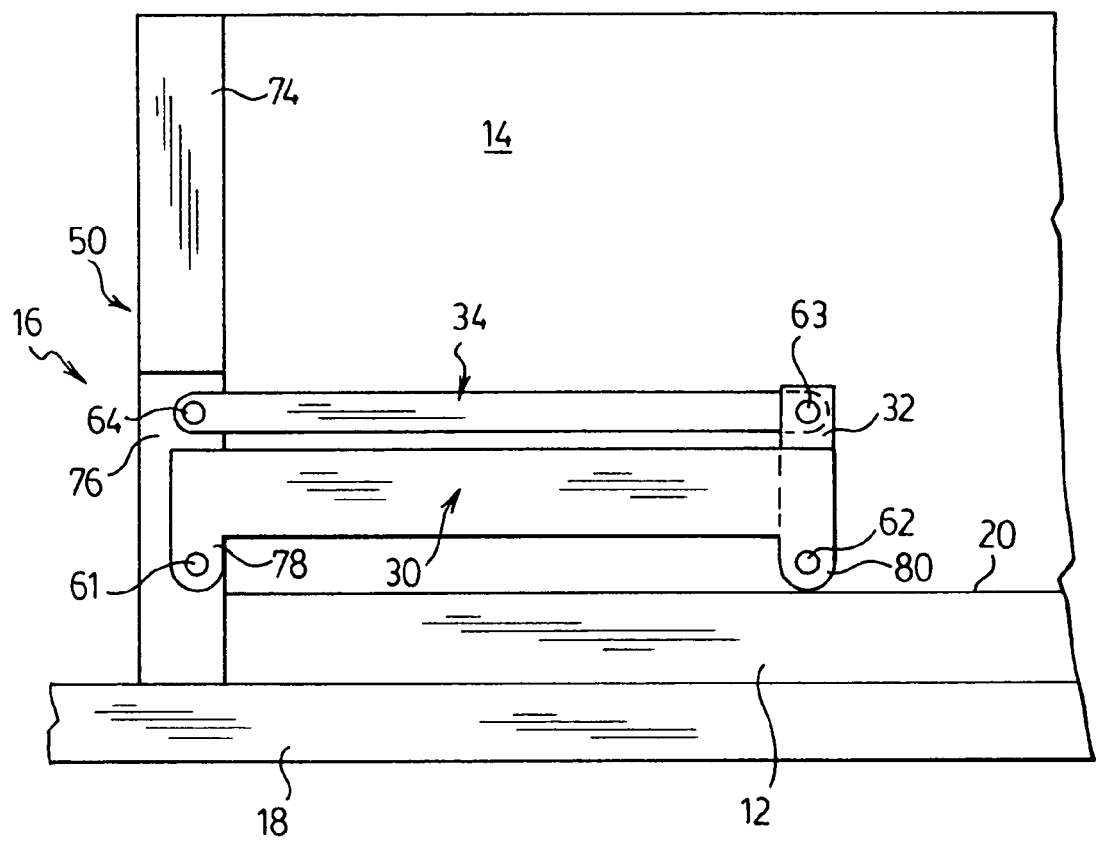
FIG. 8 is a cross-section the same as in FIG. 6 but with the front gate assembly in a storage position.

Reference is made to FIGS. 6, 7 and 8 which illustrate a second embodiment of a gate assembly similar to that illustrated in the first embodiment and in which identical reference numerals are used to refer to identical elements. Each of FIGS. 6, 7 and 8 represent side views comparable to those illustrated in FIGS. 4 and 5. As is apparent, FIG. 6 illustrates the gate assembly 16 in a closed, upright and stacked condition. FIG. 7 illustrates the gate assembly in an extended open position. FIG. 8 illustrates the gate assembly in a storage position being a position in which the gate assembly is folded inwardly to overlie the bed 12 as can be advantageous for shipment of the trailer in a collapsed condition as, for example, preferably if the trailer has posts 50 formed in two parts with an upper portion 74 and the side wall 14 to be removable as, for example, with the upper portion 74 having a swaged protrusion to extend downwardly into a lower portion 76 of the post 50. The four elements comprising the lower gate member 30, upper gate member 32, link member 34 (or 35) and the post 50 (or 51) are movable in a pantograph manner between the open, closed and storage positions. In the second embodiment, the first axis 61 and the third axis 63 are disposed at a height above the surface 20 of the bed 12 as, for example, by providing on each end of the lower gate member 30, upstanding ears 78 and 80 for coupling to pivot about the first axis 61 and the third axis 63, respectively.

Figure 9:
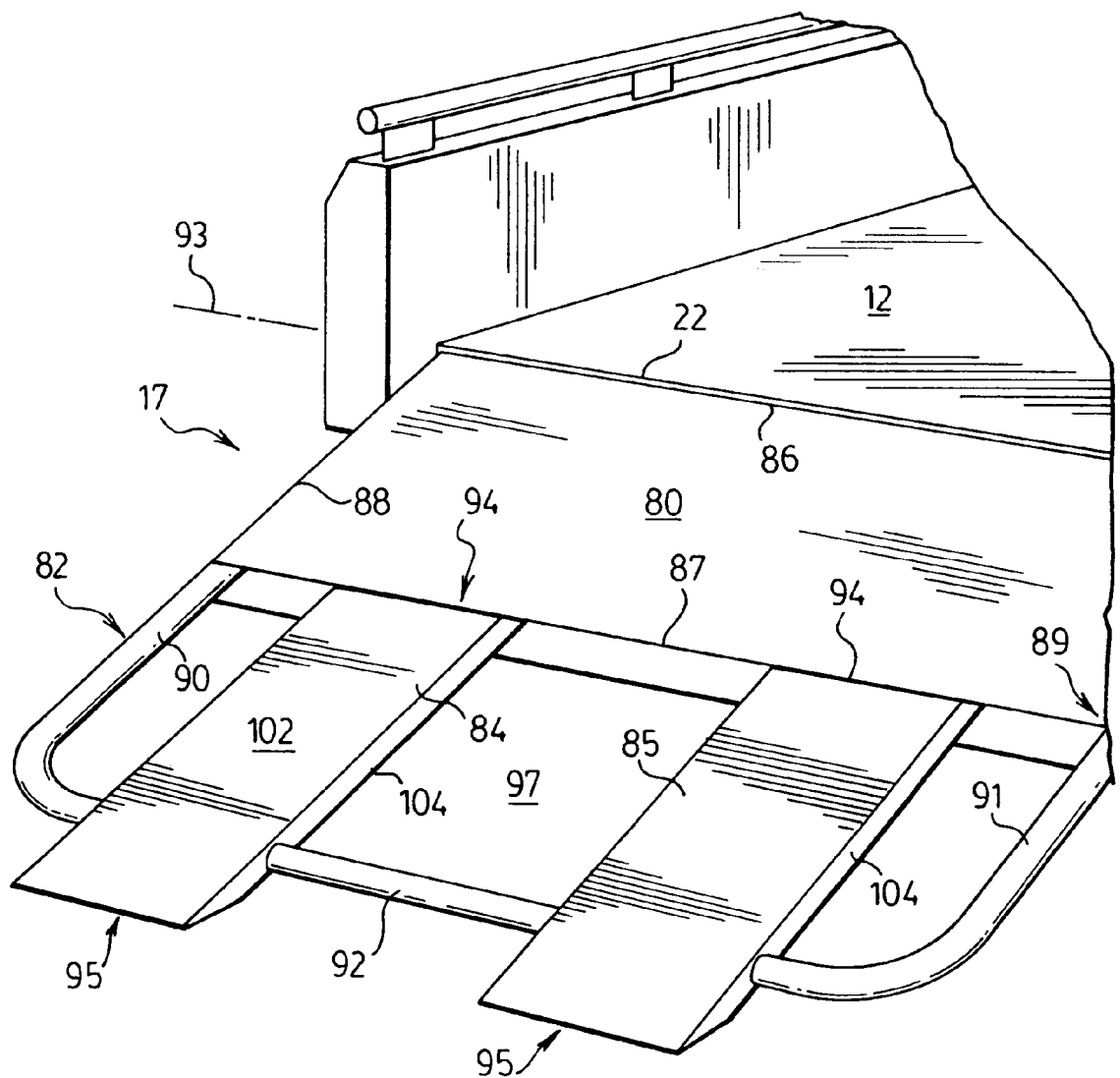
FIG. 9 is an enlarged pictorial view of the rear end of the trailer showing the rear gate assembly in a ramp position.
Figure 10:
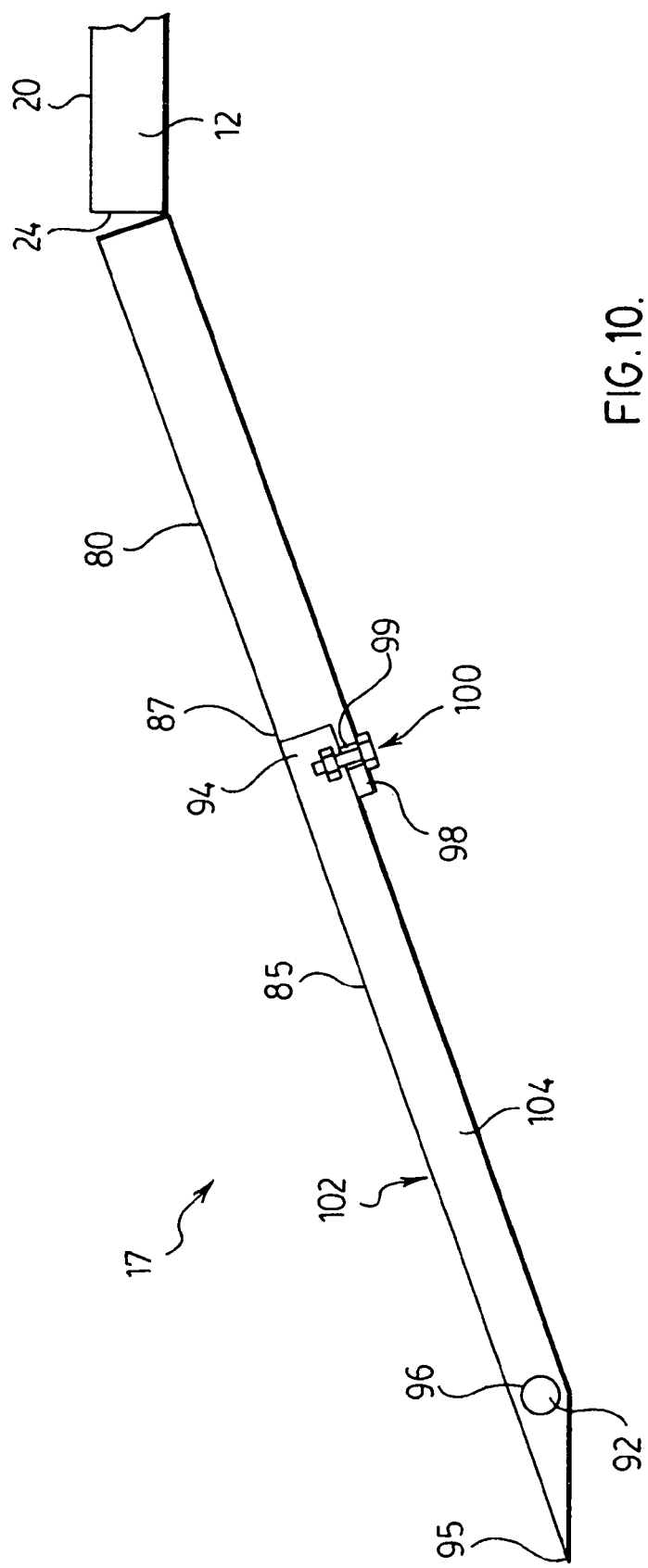
FIG. 10 is cross-sectional side view along section line 7-7' in FIG. 6 through the rear gate assembly.

Reference is made to FIGS. 9 and 10 which illustrate the tail gate assembly 17 for the trailer which also functions as a ramp useful for on and off loading of the trailer. The gate assembly 17 includes a lower gate member 80, a U-shaped tube 82 and a pair of elongate ramp members 84 and 85. The lower gate member 80 has an inner end 86 and an outer end 87 parallel to the inner end 86 as well as two side ends 88 and 89. The U-shaped tube 82 includes a pair of side extension members 90 and 91 which are joined at their outer end by an upper end member 92. Each side extension member 90 and 91 has a distal inner end with each side extension member 90 and 91 fixedly connected at its inner end to the lower gate member 80 proximate the side ends 88 and 89 of the lower gate member 80 such that the tube 82 and each of its side extension members 90 and 91 extend in a plane of the lower gate member 80 from the outer end 87 of the lower gate member 80 away from the lower gate member 80 adjacent each side end to the upper end member 92. As seen, each side extension member 90 and 91 extend parallel to each other laterally spaced from each other. The upper end member 92 bridges between the side extension members 90 and 91 spaced outwardly from the outer end 87 of the lower gate member 80. Each of the two ramp members 84 and 85 has an inner end 94 and an outer end 95. Each ramp member 84 and 85 bridges between the outer end 87 of the lower gate member 80 and the upper end member 92. Each ramp member 84 and 85 is disposed parallel to the other. The inner end 94 of each ramp member is coupled to the outer end 87 of the lower gate member 80 in a manner which permits for side-to-side sliding of each ramp member relative to the lower gate member 80. The outer end 87 of each ramp member is coupled to the upper end member 92 in a manner which permits for side-to-side sliding of each ramp member relative to the upper end member 92. The inner end 86 of the lower gate member 80 is pivotally connected to the trailer at the rear deck end 22 of the bed 12 for pivoting about an axis 93 between a closed storage position in which the gate assembly 17 extends upwardly from the rear deck end 22 as seen in FIG. 1 and an open, ramp position in which outer portions of the gate assembly 17 engage the ground about the trailer and the gate assembly 17 bridges the rear deck end 22 of the bed 12 and the ground as shown in FIGS. 9 and 10.

Each ramp member 84 and 85 is adapted to receive its support loads to be moved across the gate assembly 17 between the lower gate member 80 and the upper end member 92.

Each ramp member 84 and 85 has an aperture 96 extending laterally therethrough proximate its outer end 95 through which the upper end member 92 of the U-shaped tube 82 extends for coupling each ramp member to the upper end member 90 for side-to-side sliding.

As seen in FIG. 9, conceptually, an interior window 97 is provided through the gate assembly 17 defined between the two side extension members 90 and 91 and between the inner end 86 of the lower gate member 80 and the upper end member 92. Each ramp member is seen to traverse the window 97. The window 97 permits sight and vision transversely through the window 97 other than where the ramp members traverse the window 97.

Preferably as shown, each ramp member 84 and 85 has a width less than half a width of the window 97 between the side extension members 90 and 91. Preferably, the ramp members 84 and 85 are selected such that the ramp members cumulatively do not block greater than one half of the width of the window 97.

As seen in FIG. 10, the outer end 87 of the lower gate member 80 preferably is provided to have an outwardly extending flange 98 which provides a shoulder upon which the inner end 94 of each ramp member may rest. This flange is preferably provided with an array of side-to-side spaced openings 99. For each ramp member, at least one nut and bolt assembly 100 is provided to extend through an aperture provided in the ramp member so as to secure the ramp member to the outer end 87 of the lower gate member 80. By removing the nut and bolt assembly 100, each member may then be manually slid side-to-side on the flange 98 so as to position and locate the ramp member at different side-to-side positions. Each ramp member preferably has an upper surface 102 and a vertically extending side surface 104 on each side with the openings 99 provided through the side surfaces 104 on each side such that a pair of apertures 96 for each ramp member assists in maintaining each ramp member in a relation parallel to each other and mounted for side-to-side sliding while being kept parallel.

The preferred embodiment shows the ramp members as being used on a tail gate. It is appreciated, however, that rather than being a tail gate, a similar gate assembly could be provided on a side or front of a trailer or other vehicle such as a pickup truck.

Each ramp member is adapted to be manually slid side-to-side so as to permit location of the ramp member at desired locations as, for example, for rolling a four-wheeled vehicle onto or off of the trailer with each ramp member to be spaced having regard to the spacing between the wheels of the vehicle. Alternatively, the two ramp members may be moved together to provide an increased width walkway. Each ramp member is adapted to receive and support loads to be moved across the ramp member between the ground and the inner ramp element.

Various locking mechanisms such as pins, bolts or the like may preferably be provided to secure the inner ends 94 of the ramp members to the lower gate member 80 and are illustrated, by example, as a simple nut and bolt in FIG. 10.

While the invention has been described with reference to preferred embodiments, many modifications and variations will now occur to persons skilled in the art. For a definition of the invention, reference is made to the following claims.

I claim:

1. A trailer having
a support deck having two side ends, a front end and a rear end,
a pair of spaced post members each fixedly coupled to the deck to be upstanding from the deck adjacent the same one end of the deck selected from the two side ends, the front end and the rear end,
a gate assembly comprising a lower gate member, an upper gate member and a pair of elongate link members,
the lower gate member having a lower end, an upper end parallel the lower end, and two side ends,
the lower end of the lower gate member connected to the trailer between the post members for pivoting about a first axis between a closed position in which the lower gate member extends upwardly from the one end of the deck to close the trailer between the post members and an extended position in which the lower gate member extends from the one end of the deck as an extension of the deck substantially in the same plane as the deck,
the upper gate member having a lower end, an upper end parallel the lower end, and two side ends,
the lower end of the upper gate member pivotably connected to the upper end of the lower gate member for pivoting about a second axis parallel to the first axis between a stacked position in which the upper gate member extends upwardly from the upper end of the lower gate member when the lower gate member is in the closed position to close the trailer between the post members above the lower gate member and a fence position in which the upper gate member extends upwardly from the upper end of the lower gate member when the lower gate member is in the extended position,
the link members each having a first end and a second end,
each first end of each link member pivotably coupled to a respective one of the two side ends of the upper gate member spaced from the second axis towards the upper end of the upper gate member for pivoting about a third axis parallel to the first axis,
each second end of each link member pivotably coupled to a respective one of the post members spaced upwardly from the first axis for pivoting about a fourth axis parallel to the first axis,
wherein the link members, the post members, the lower gate member and the upper gate member are pivotably coupled together for pivoting about the first axis, second axis, third axis and fourth axis such that when the lower gate member moves to its extended position, the upper gate member moves to its fence position and when the lower gate member moves to its closed position the upper gate member moves to its stacked position.

2. A trailer as claimed in claim 1 including
a support mechanism supporting the lower gate member in the extended position against pivoting about the first axis from the closed position beyond the extended position.

3. A trailer as claimed in claim 1 wherein the one end of the support deck is the front end.

4. A trailer as claimed in claim 1 wherein the lower end of the lower gate member is connected to a respective one of the post members and/or the one end of the deck for pivoting about a first axis.

5. A trailer as claimed in claim 1 wherein each post member is located on the front end of the deck proximate each side end of the deck.

6. A trailer as claimed in claim 1 wherein including releasable lock mechanism to lock the lower gate member in the closed position and lock the upper gate position in the stacking position.

7. A trailer as claimed in claim 6 wherein the lock mechanism prevents movement relative to each other of any two elements selected from: one of the post members, one of the link members, the lower gate member and the upper gate member.

8. A trailer as claimed in claim 6 wherein the lock mechanism comprises a pin extending generally parallel to the first axis through any two elements selected from: one of the post members, one of the link members, the lower gate member and the upper gate member.

9. A trailer as claimed in claim 1 wherein the distance between the first axis and the second axis is the same as the distance between the third axis and the fourth axis.

10. A trailer as claimed in claim 1 wherein the distance between the first axis and the fourth axis is the same as the distance between the second axis and the third axis.

11. A trailer as claimed in claim 1 wherein the distance between the first axis and the second axis is the same as the distance between the third axis and the fourth axis and the distance between the first axis and the fourth axis is the same as the distance between the second axis and the third axis.

12. A trailer as claimed in claim 1 wherein (a) the upper gate member, (b) the lower gate member, (c) the link members and (d) post members form a pantograph arrangement with the upper gate member maintained parallel to a line through the first axis and the fourth axis and with the lower gate member maintained parallel to the link members.

13. A trailer as claimed in claim 10 wherein the upper gate member is maintained substantially vertical.

14. A trailer as claimed in claim 6 wherein the lock mechanism comprises a pin extending generally parallel to the first axis through an opening in one of the post members, through an opening in one of the link members, and into an opening in the lower gate member at a location spaced between the first axis and the fourth axis.

15. A trailer as claimed in claim 6 wherein the lock mechanism comprises a pin extending generally parallel to the first axis through an opening in one of the post members, through an opening in one of the link members, and into an opening in the upper gate member at a location spaced between the second axis and the third axis.

16. A trailer as claimed in claim 3 wherein
a towing tongue extending from underneath the deck forwardly from the front end of the deck,
the towing tongue supporting the lower gate member in the extended position against pivoting about the first axis from the closed position beyond the extended position.

* * * * *